May 26, 1970  T. KOZOWYK ET AL  3,513,927
MECHANICAL ACTUATOR WITH TORSION BAR SYSTEM
Filed Oct. 4, 1967
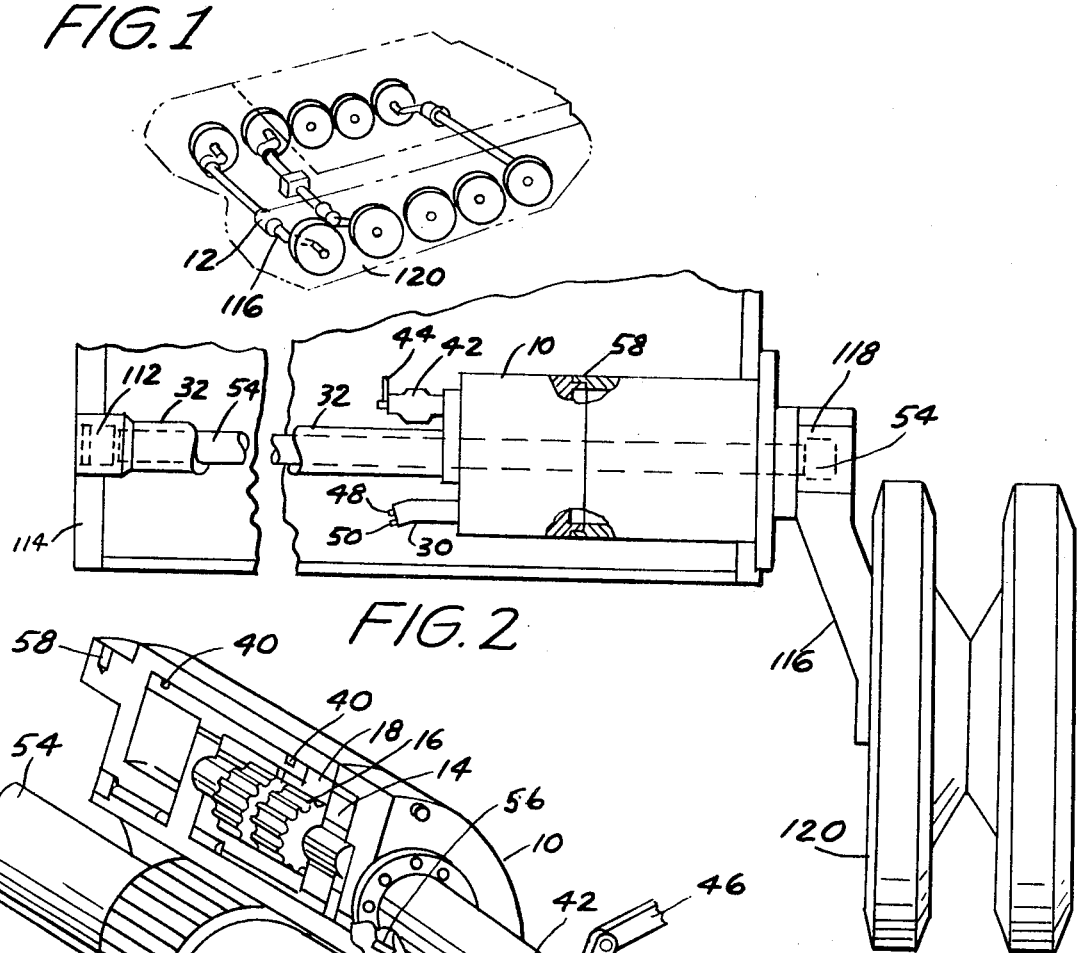
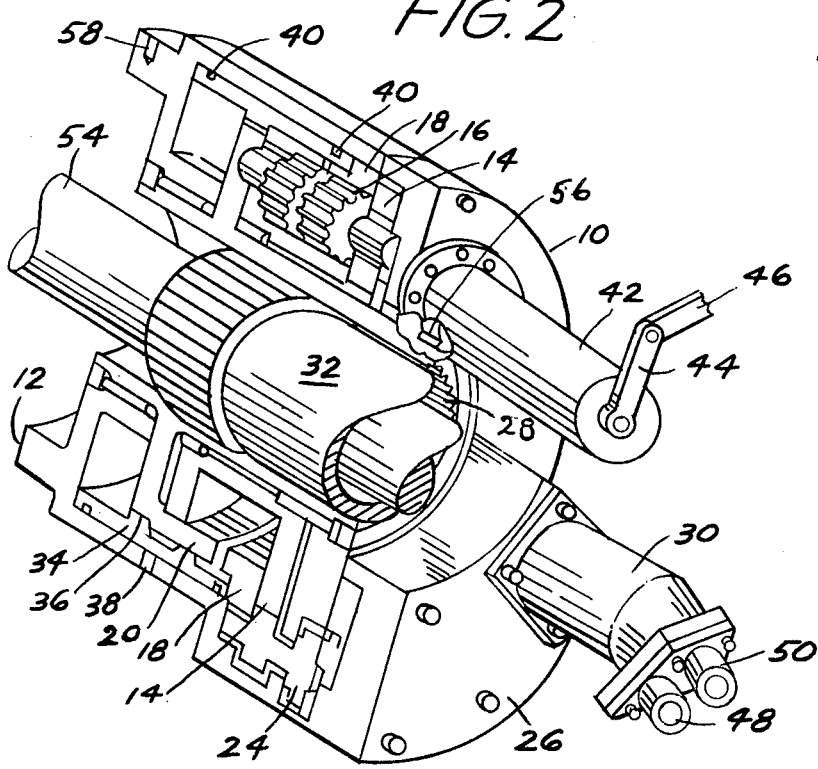
ALEX H. SINCLAIR
TED KOZOWYK
WILLARD R. GREEN
INVENTORS
BY H. M. Saragovitz
E. J. Kelly, H. Berl
and M. V. Wallace
ATTORNEYS

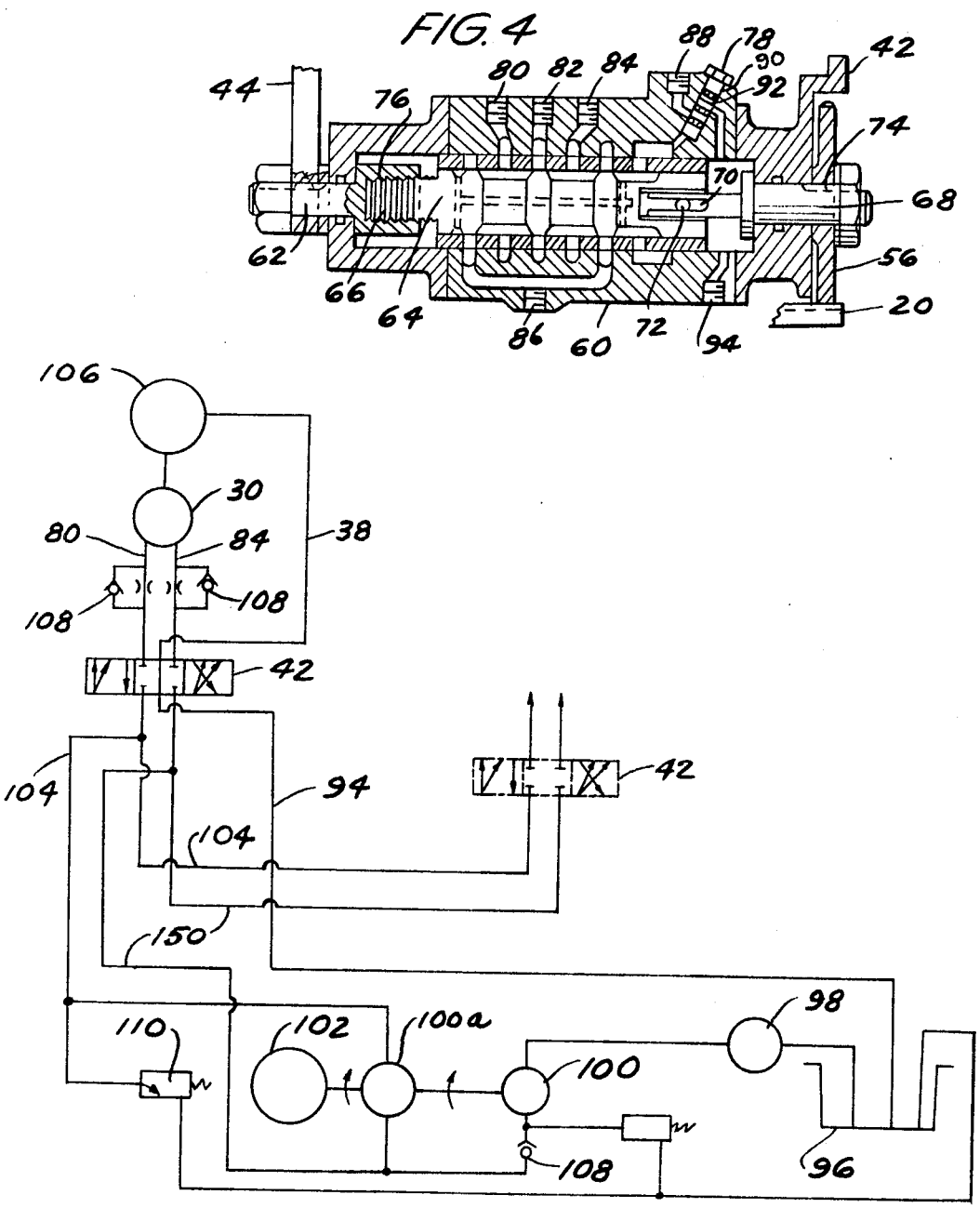

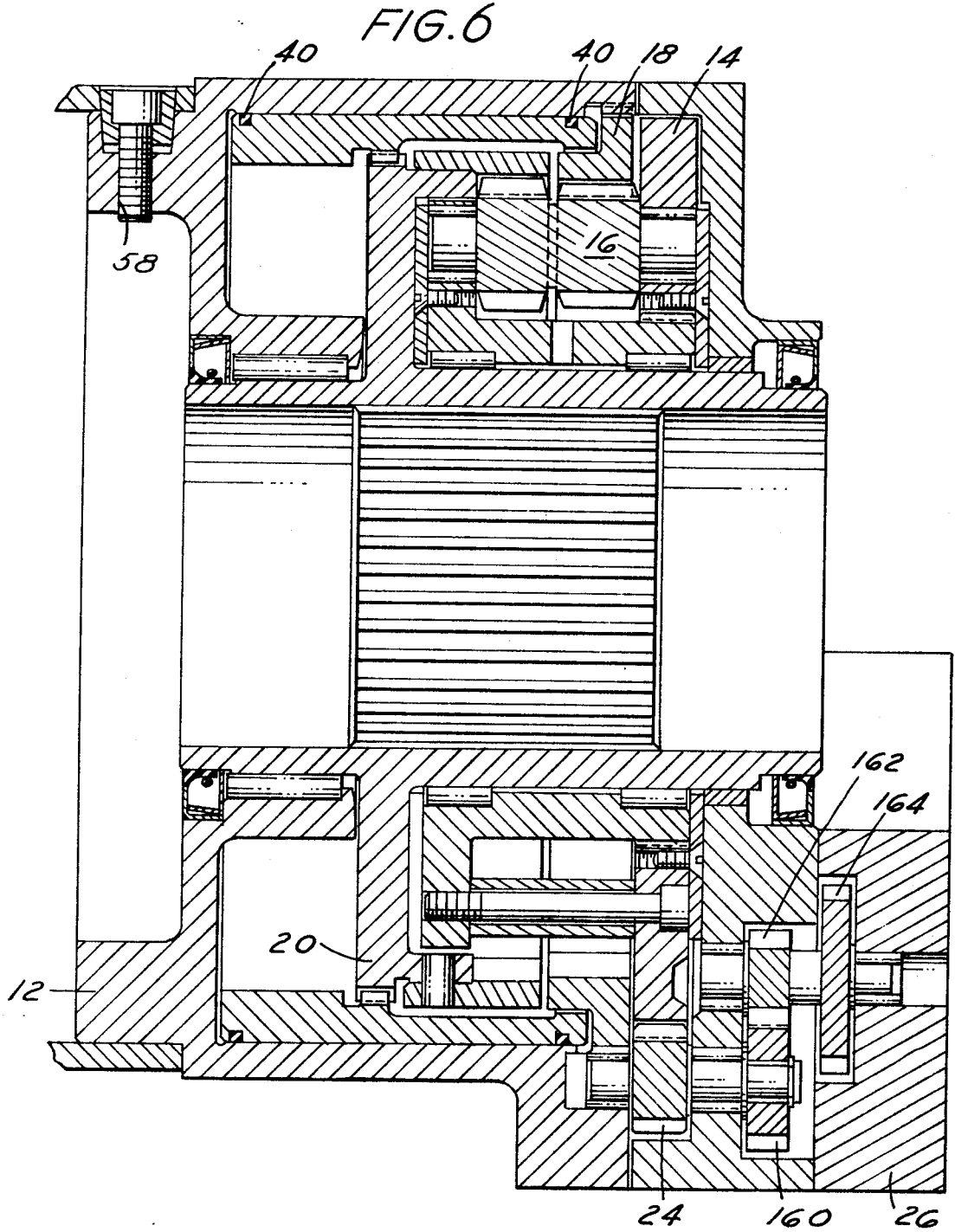

United States Patent Office 3,513,927
Patented May 26, 1970

3,513,927
MECHANICAL ACTUATOR WITH TORSION
BAR SYSTEM
Ted Kozowyk and Alex H. Sinclair, Detroit, and Willard
R. Green, Dearborn, Mich., assignors, by direct and
mesne assignments, to the United States of America
as represented by the Secretary of the Army
Filed Oct. 4, 1967, Ser. No. 672,939
Int. Cl. B60g 17/00; B62d 55/10
U.S. Cl. 180—41        5 Claims

ABSTRACT OF THE DISCLOSURE

An apparatus for actuating and controlling the variable ground clearance of tracked or wheeled vehicles. The height control system is adapted to selectively raise and control the height of the vehicle by a hydraulically controlled mechanical gearing actuator to rotate the torsion bars on which the wheels are mounted. The vehicle may be pitched or canted by selectively raising or lowering any combination of vehicle wheels.

This invention relates to a suspension system adapted to change vehicle ground clearance positions of any tracked or wheeled vehicle.

In the past multi-wheel vehicles have been designed for use as battle tanks, gun carriers, troop carriers, or the like, wherein, within applicants' knowledge, the top ground clearance has been seventeen or eighteen inches, which height has not proven too successful especially on uneven terrain or muddy ground.

The present disclosure sets forth a new and improved multi-wheel vehicle, and more particularly a vehicle height control actuator system adapted to selectively raise and control the height of the vehicle by torsion bar rotation, which may be used wtih a dampener as disclosed in United States patent application Ser. No. 672,937, filed on Oct. 4, 1967.

The principal object of the present invention is to provide a new and improved height control actuator for multi-wheeled vehicles, which in turn provides greater ground clearance than formerly obtained and which allows the vehicle to pass over obstacles of greater height than can be traversed with known multi-wheeled vehicles, and by means of which the wheels are raised or lowered to pre-determined heights simultaneously.

Another object of the invention is to provide a new and improved device by which the vehicle cant or pitch can be changed, causing the vehicle silhouette to be raised or lowered by selectively raising and lowering any combination of vehicle wheels whether back or front or those located in staggered opposed relationship on either side of the vehicle.

A still further object of the present invention is to provide a new and improved means for achieving variable ground clearance enabling the vehicle to maintain higher average speeds than presently obtained when traversing mud and large obstacles normally encountered in cross-country operations.

Another object of the invention is to provide means for obtaining high wheel, i.e., elevated vehicle travel which in turn increases vehicle speed when traversing irregular terrain.

A still further object of the invention is to provide a fail-safe system which will automatically engage a vehicle elevation system integral locking device upon power failure during raising or lowering of the vehicle.

The above and other objects of the invention will appear more fully from the following more detailed description, and from the drawings, wherein:

FIG. 1 is a view of a tank hull partly broken away to show the wheel suspension of same and the manner in which the actuators are secured thereto.

FIG. 2 is a perspective view showing how the actuator is secured to the housing and to the torsion tube and how the road arm and wheel are secured to the spindle and torsion bar.

FIG. 3 shows the actuator partly broken away.

FIG. 4 is a section through the rotary control valve shown in FIG. 3, taken longitudinally thereof.

FIG. 5 is a schematic diagram of the hydraulic control for the actuator shown in FIG. 3; and FIG. 6 is a section taken substantially along line 6—6 of FIG. 3.

Referring now to the drawings in detail wherein like reference characters designate like and corresponding parts throughout the several views there is shown in FIG. 3 a hydraulically controlled high control system comprising a variable height suspension actuator 10 that is hydraulically controlled. Actuator 10 has a housing 12 secured to a housing 11 which is secured to a wall 8. The actuator per se comprises a mechanical gear train consisting of a differential gear carrier 14 having ten compound pinions 16 which in turn mesh with internal ring gears, a stationary ring gear 18 and a bell gear 20.

The differential pinions 16 are supported by a carrier 14 which is driven by a spur gear train consisting of four compound gears 24, 160, 162, 164 housed in a motor pad and spur gear housing 26 and driven by a pinion, not shown, at a motor 30. When there is no lock and the gears are driven by motor 30, gear 24 drives gear carrier 14 causing the gears 16, fixed on their pinion, to rotate because of stationary ring gear 18 acting on the right gear 16. Left gear 16 having a greater number of teeth than right gear 16 rotates member 20 which includes the ring gear for the left side gear 16. The bottom half of FIG. 3 and FIG. 6 best shows the relationship of the parts.

A torsion tube 32 is connected to the internal bell gear 20 through splines 28 and the bell gear is splined to a lock member 34 through splines 36. A port 38 is provided to allow fluid under pressure to be introduced between the contacting surfaces of the rotary lock member 34 and the housing side 12. Lock 34, a cylindrical member, rotates with member 20 when fluid pressure separates lock 34 from the wall of housing 12. A locking condition is obtained. When there is no fluid pressure in port 38 because the lock ring 34 expands against the wall of housing 12 with sufficient force to prevent slipping between lock 34 and the wall of housing 12 thereby forming a solid connection from the torque tube 32 to the housing 12. Lock member 34 is usually provided with an outside diameter of about .005 inch greater than the internal diameter of housing 12 where the lock member 34 is located providing an interference friction lock until high pressure fluid separates these members. Seals 40 are provided and located at the end of rotary member 34 to retain the fluid.

A hydraulic control valve 42 is provided and located adjacent to the actuator unit 10, said valve having a control lever 44 mounted thereon and being connected by linkage 46 leading to the driver's seat within the vehicle. Valve 42 is provided with a feed back gear 56 connected to bell gear 20, the same being provided to nullify the driver's imput when the vehicle reaches a predetermined position. Two ports 48, 50, are provided for motor 30 for a purpose later to be described.

FIG. 4 discloses, in cross section, a flow and position control valve for the purpose of controlling the specific elevating elements of the suspension system, the valve comprising a housing 60 having a control lever 44 mounted upon an imput shaft 62 which in turn has secured thereto a movable spool 64, said spool being threaded, as at 66. The opposite end of spool 64 is coupled to a feedback shaft 68 by means of an axial slot 70 in shaft 68 and a pin 72 which is permanently set in valve spool 64. Feedback shaft 68 is secured to gear 56, FIG. 4, by means of a key 74 and gear 56 is driven by bell gear 20. Corresponding threads 76 are cut in member 62 to mate with threads 66 of member 64.

A shuttle valve 78 is disposed within housing 60, the same having a plunger 90 and a spring 92 adapted to relieve or bleed the interference type locking mechanism consisting of members 34 and housing 12 in a locked position. Suitable ports 80, 82, 84 are provided to allow fluid flow to port 86 located in the lower portion of the housing. A port 88 allows fluid to flow to a port 94 and locking mechanism port 38.

FIG. 2 shows how the above described actuator and valve are mounted upon a vehicle upon a torsion tube 32 and bar 54 and how the torsion tube 32 is journaled as at 112 in one side of the vehicle hull 114 and how the road arm 116 is rotatably secured to a spindle 118 and also how the road wheel 120 is rotatably secured to road arm 116.

FIG. 5 discloses a schematic diagram of the hydraulic system, the same comprising a reservoir 96, a filter 98, a make-up pump 100 delivering fluid through check valve 108 to the inlet of dual pressure compensated pump 100a, a motor 102 for driving the pumps, a high pressure delivery line 104 leading to valve 42 at one or more road wheels. A phantom valve 42 is shown to indicate a second wheel served by a second actuator. High pressure fluid from line 104 is directed alternately by valve 42 to line 80 or 84 and the unused line opens to line 150 which returns to the inlet side of the pump 100a thereby driving reversible motor 30 in one direction or the other, and whenever the valve 42 is moved from the neutral position to actuate motor 30, high pressure fluid from 104 is delivered to lock 106 by line 38 to unlock it and permit the motor 30 to drive the gear train.

The manner in which the device operates is as follows:

Each wheel of the vehicle has a suspension unit consisting of a roadarm, torsion bar, torsion tube, and actuating unit. A vehicle could consist of from four to twelve wheels either individually controlled or in combination to raise, lower or cant the vehicle.

In operation the vehicle, in order to raise the same, rotates lever 44 through a control panel located adjacent the driver's seat in the vehicle, not shown, to a desired height position. The height and position indicator can be any well known visual mechanical lever pointed mechanism provided a ready indication of degree or inches of movement of the vehicle hull, or the indicator may be any known means for providing a height reference, not shown. The maximum travel of suspension unit could also be a ready indicator as maximum and minimum height.

In the schematic valve 42 of FIG. 5, the right side valve connections are selected for description purposes as raising the vehicle and this will correspond with an axial displacement of spool 64 in FIG. 4, to the right. To raise the vehicle, therefore lever 44 is rotated to a new position behind FIG. 4, which moves spool 64 to the right and permits high pressure fluid connected at port 86 to flow to port 84 and to the bottom of plunger 90 moving it up against the spring 92 force whereby high pressure fluid is delivered to port 88 and port 94 is closed. The high pressure fluid is directed from port 88 to port 38 to release the schematic lock 106 as is shown in FIG. 5, by lines 38. At the same time, viewing FIGS. 3 and 4 together, high pressure oil is delivered from port 84 to port 50 causing motor 30 to rotate to elevate the vehicle and the low pressure fluid moves from port 48 into port 80 and out port 82, all of which is shown in simplified form in the schematic FIG. 5.

Motor 30 used herein is a well known high speed low torque type used extensively by the aircraft industry. The model shown herein was manufactured by Vickers, Inc., of Detroit, Mich. The carrier gear 14 rotates the compound pinions 16 which in turn rotates bell gear 20. The compound pinions 16 have thereon two different number of teeth thereby providing reduction in rotary speed between carrier 14 and bell gear 20. Bell gear 20 rotates torsion tube 32 through spines 28 which in turn rotates torsion bar 54, spindle 118 and roadwheel arm 116.

As the vehicle is being raised feedback gear 56, which meshes with bell gear 20, rotates feed back shaft 68 to move spool 64 axially to the left until spool 64 is moved to neutral position. As spool 64 reaches its neutral position, port 86 is closed, the plunger 90 therefore is pushed down by spring 92 to open port 88 to port 94 through shuttle valve 78 thus venting the lock.

To lower the vehicle, lever 44 is rotated to a new position to move spool valve 64 to the left in FIG. 4, which allows high pressure fluid to move from port 88 to the lock and to port 80 to drive motor 30 in the reverse direction until the spool is neutralized by the feedback from gear 56.

During a power failure the hydraulic fluid is displaced from a pressurized cavity consisting of rotary member 34 and stationary member 12 whereby members 34 and 12 become frictionally locked by interference between them making the locking mechanism fail safe.

There has been disclosed herein a new and improved device for raising and lowering a vehicle. With this device a vehicle can be raised to heights to accomplish ground clearance not previously possible and to achieve high cross-country vehicle speeds providing more comfort to the personnel operating the vehicle.

Various changes and modifications can be made in the above described mechanisms without departing from the spirit of the invention. Such changes and modifications are contemplated by the inventors and it should be understood that they do not wish to be limited except by the scope of the appended claims.

We claim:

1. A variable height suspension system comprising in combination a vehicle, torque means comprising a torsion bar within a torsion tube, a roadarm mounted upon said torsion bar, suspended beneath said vehicle, a road wheel rotatably mounted upon said roadarm, means for raising and lowering said vehicle mounted upon said torsion tube comprising a planetary gear train actuator having a locking mechanism therein, a control valve and a hydraulic motor mounted adjacent said planetary gear train, a fluid reservoir and fluid pump mounted adjacent said actuator, means for transferring fluid from said reservoir by means of said pump to said control valve, means for transferring fluid from said control valve to said locking mechanism and said hydraulic motor, whereby the locking mechanism is released and said hydraulic motor rotates said mechanical gear train actuator, whereby said gear train actuator rotates said torsion tube and torsion bar and hence said roadarm mounted on said torsion bar and said roadwheel mounted on said roadarm.

2. A variable height suspension system comprising, in combination,
a vehicle,
torque means comprising a torsion bar within a torsion tube,
a roadarm mounted upon said torsion bar suspended beneath said vehicle,
a roadwheel rotatably mounted upon said roadarm,
means for raising and lowering said vehicle mounted upon said torsion tube, comprising,
a mechanical planetary gear train actuator mounted upon said torsion means,
said gear train having interference type-locks therein, and
means to supply said mechanical gear train with power to open said locks and to rotate said torque means and in turn said roadarm and roadwheel.

3. A variable height suspension system as set forth in claim 2, wherein,
said actuator mounted on said torque means has valve means connected thereto to control same,
said valve means providing predetermined ground height selectivity,
means within said actuator to lock same at a predetermined height,
means within said actuator for unlocking said lock, and
means for overcoming power failure by releasing said locking means from its unlocked position.

4. A variable height suspension system as set forth in claim 2, wherein,
said raising and lowering means comprises, a mechanical gear train actuator mounted on said torque means,
said actuator having interference type locks therein,
power means for supplying power to said actuator to open said locks and to rotate said torque means and thereby affecting the ground clearance of said vehicle, and
automatic means for overcoming power failures by means of releasing said interference type locking means from its unlocked position.

5. A variable height suspension system as set forth in claim 2, wherein said vehicle raising and lowering means comprises a mechanical gear train actuator mounted upon said torsion means, said gear train comprising,
a housing,
a carrier,
differential pinions supported by said carrier,
a spur gear train consisting of compound gears adapted to drive said carrier and differential pinions,
a bell gear mounted upon said torsion means and in contact with a lock member,
a port to allow fluid under pressure to be introduced between said lock member, and sealing means located at the opposed ends of said rotary members to retain fluid within said housing.

References Cited

UNITED STATES PATENTS

| | | | |
|---|---|---|---|
| 1,590,528 | 6/1926 | Lansing | 74—803 |
| 3,262,522 | 7/1966 | Johnson | 180—9.2 X |
| 3,352,565 | 11/1967 | Reynolds | 180—9.2 X |
| 3,371,940 | 3/1968 | Sinclair | 180—9.2 X |

RICHARD J. JOHNSON, Primary Examiner

U.S. Cl. X.R.

180—9.2, 22; 280—6